(12) United States Patent
Nama et al.

(10) Patent No.: US 12,412,479 B2
(45) Date of Patent: Sep. 9, 2025

(54) METHOD AND SYSTEM TO UNIQUELY REPRESENT CERTIFIED AND UNCERTIFIED APPLICATIONS DATA FOR AN AIRCRAFT

(71) Applicant: HONEYWELL INTERNATIONAL INC., Charlotte, NC (US)

(72) Inventors: Naveen Venkatesh Prasad Nama, Bangalore (IN); Sivaprasad Kolli, Hyderabad (IN); Anil Kumar Songa, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 308 days.

(21) Appl. No.: 18/160,354

(22) Filed: Jan. 27, 2023

(65) Prior Publication Data

US 2024/0185728 A1 Jun. 6, 2024

(30) Foreign Application Priority Data

Dec. 1, 2022 (IN) .............................. 202211069367

(51) Int. Cl.
*G08G 5/00* (2025.01)
*B64C 27/00* (2006.01)
(Continued)

(52) U.S. Cl.
CPC ............... *G08G 5/50* (2025.01); *B64D 45/00* (2013.01); *G06F 3/14* (2013.01); *G08G 5/30* (2025.01); *G08G 5/55* (2025.01); *B64C 27/00* (2013.01)

(58) Field of Classification Search
CPC ... G08G 5/50; G08G 5/30; G08G 5/55; B64D 45/00; B64C 27/00; H10D 30/797;
(Continued)

(56) References Cited

U.S. PATENT DOCUMENTS 7,127,683 B2 10/2006 Royalty
7,321,318 B2 * 1/2008 Crane .................. G01C 23/005
715/861

(Continued)

FOREIGN PATENT DOCUMENTS

EP 3477619 A1 5/2019
WO 2008106316 A2 9/2008
WO 2013013243 A1 1/2013

OTHER PUBLICATIONS

Yeh, Michelle, et al., "Pilot Perceptions on the Integration of Electronic Flight Bag Information in New Flight Deck Designs," Proceedings of the Human Factors and Ergonomics Society 2019 Annual Meeting, p. 91-95, downloaded on Sep. 6, 2022.

*Primary Examiner* — Mussa A Shaawat
(74) *Attorney, Agent, or Firm* — Ingrassia Fisher & Lorenz, LLP

(57) ABSTRACT

Methods and systems are provided for displaying uncertified data for aircraft operations. The method comprises receiving certified data for aircraft operations. The certified data is provided by devices and software applications that have a predetermined acceptable degree of accuracy. Additionally, uncertified data is received for aircraft operations and the uncertified data is provided by devices and software applications that have an undetermined degree of accuracy. A display is created of the certified data for a display device that is used by an aircraft crewmember of an aircraft. Additionally, a display is created of the uncertified data for the display device. The certified data display is overlayed with the uncertified data display on the display device to create a combined data display. The uncertified data is clearly indicated on the combined data display.

14 Claims, 11 Drawing Sheets

(51) Int. Cl.
*B64D 45/00* (2006.01)
*G06F 3/14* (2006.01)
*G08G 5/30* (2025.01)
*G08G 5/50* (2025.01)
*G08G 5/55* (2025.01)

(58) Field of Classification Search
CPC .. H10D 48/362; H10D 62/13; H10D 84/0126; H10D 29/39; G06F 3/14
See application file for complete search history.

(56) References Cited

U.S. PATENT DOCUMENTS

| | | | |
|---|---|---|---|
| 8,019,489 B2* | 9/2011 | Harrison | G01C 23/005 |
| | | | 455/431 |
| 9,141,830 B2* | 9/2015 | Uczekaj | H04L 67/12 |
| 9,260,182 B2* | 2/2016 | Hathaway | H04L 63/0428 |
| 9,284,045 B1* | 3/2016 | Springer | G08G 5/21 |
| 9,529,356 B2* | 12/2016 | Mere | G05D 1/00 |
| 9,980,298 B2 | 5/2018 | Batsakes et al. | |
| 11,017,297 B2* | 5/2021 | Selvarajan | G06F 9/541 |
| 2014/0074322 A1* | 3/2014 | Baumgarten | B64D 45/00 |
| | | | 701/3 |
| 2016/0103579 A1* | 4/2016 | Coulmeau | G08G 5/21 |
| | | | 701/533 |
| 2017/0183105 A1* | 6/2017 | Fournier | G08G 5/55 |
| 2018/0357561 A1 | 12/2018 | Selvarajan et al. | |
| 2018/0365265 A1 | 12/2018 | Blanc et al. | |
| 2019/0177157 A1* | 6/2019 | Sarma | G06F 3/0304 |
| 2019/0179097 A1* | 6/2019 | Berckefeldt | G02B 27/0093 |
| 2019/0179585 A1* | 6/2019 | True | G06T 7/0002 |
| 2019/0180718 A1* | 6/2019 | Sarma | B64D 43/02 |
| 2019/0389599 A1 | 12/2019 | Dillard et al. | |
| 2022/0164247 A1* | 5/2022 | Mead | G06F 3/147 |

\* cited by examiner

METHOD AND SYSTEM TO UNIQUELY REPRESENT CERTIFIED AND UNCERTIFIED APPLICATIONS DATA FOR AN AIRCRAFT

CROSS-REFERENCE TO RELATED APPLICATION

This application claims priority to India Provisional Patent Application No. 202211069367, filed Dec. 1, 2022, the entire content of which is incorporated by reference herein.

TECHNICAL FIELD

The present invention generally relates to aircraft operations, and more particularly relates to a method and system to uniquely represent certified and uncertified applications data for an aircraft.

BACKGROUND

The transportation industry is going through a large transformation due to the advent of data connectivity and the electronic flight bag (EFB) applications that come with such connectivity. In the aviation industry, a huge number of uncertified devices and applications are being created that can provide many useful services. These uncertified applications include everything that work outside of an aircraft electronics bus including on ground servers, cloud/web servers, external storage devices, data from air traffic control (ATC) or an airline operations center (AOC), data from other aircrafts, carry-on devices of crew or passengers onboard, electronic flight bag (EFB) applications, etc.

As more and more certified and uncertified applications start seamlessly working together, improvements are needed to solve declutter and to differentiate the certified and uncertified data when displayed together on the same display. Pilot workload increases when certified and uncertified applications data are viewed separately as there will be position and orientation differences. Hence, there is a need for a method and system to uniquely represent certified and uncertified applications data for an aircraft.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for displaying uncertified data for aircraft operations. The method comprises: receiving certified data for aircraft operations, where the certified data is provided by devices and software applications that have a predetermined acceptable degree of accuracy; receiving uncertified data for aircraft operations, where the certified data is provided by devices and software applications that have an undetermined degree of accuracy; creating a display of the certified data for a display device used by a crewmember of an aircraft; creating a display of the uncertified data for the display device; and overlaying the certified data display with the uncertified data display on the display device to create a combined data display, where the uncertified data is clearly indicated on the combined data display.

A system is provided for displaying uncertified data for aircraft operations. The system comprises: a flight management system (FMS) located on board an aircraft, where the FMS, receives certified data for aircraft operations, where the certified data is provided by devices and software applications that have a predetermined acceptable degree of accuracy, and receives uncertified data for aircraft operations, where the certified data is provided by devices and software applications that have an undetermined degree of accuracy; and a display device used by a crewmember of the aircraft, where the display device, creates a display of the certified data, creates a display of the uncertified data, and overlays the certified data display with the uncertified data display to create a combined data display, where the uncertified data is clearly indicated on the combined data display.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Methods and systems have been developed for displaying uncertified data for aircraft operations. The method comprises receiving certified data for aircraft operations. The certified data is provided by devices and software applications that have a predetermined acceptable degree of accuracy. Additionally, uncertified data is received for aircraft operations and the uncertified data is provided by devices and software applications that have an undetermined degree of accuracy. A display is created of the certified data for a display device that is used by an aircraft crewmember of an aircraft. Additionally, a display is created of the uncertified data for the display device. The certified data display is overlayed with the uncertified data display on the display device to create a combined data display. The uncertified data is clearly indicated on the combined data display.

Figure 1:
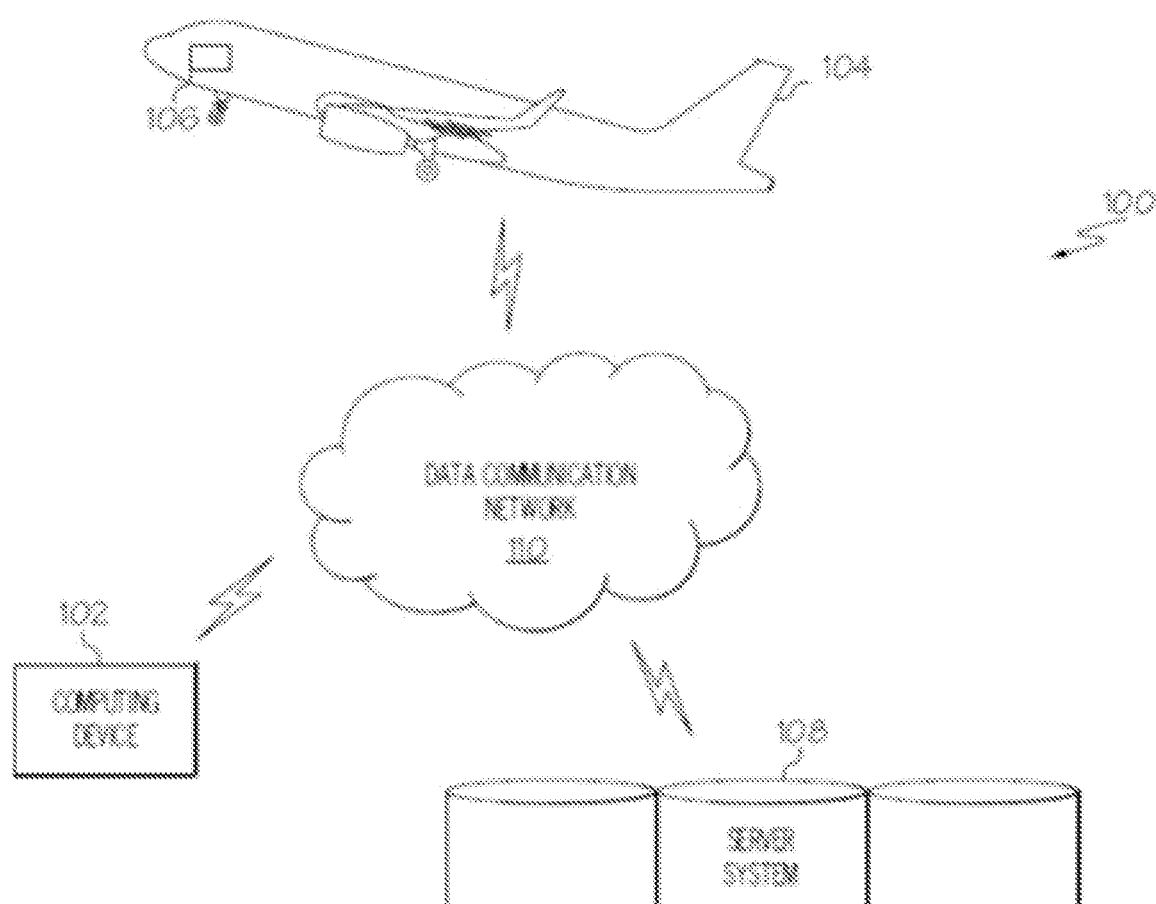
FIG. 1 shows a diagram of aircraft computer system in accordance with the disclosed embodiments.

Turning now to the figures, FIG. 1 is a diagram of aircraft computer system 100, in accordance with the disclosed embodiments. The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing Electronic Flight Bag (EFB) applications. In other embodiments, the computing device 102 may be implemented using a computer system onboard the aircraft 104.

The aircraft 104 may be implemented as an airplane, helicopter, spacecraft, hovercraft, or the like. The one or more avionics systems 106 may include a Flight Management System (FMS), navigation devices, weather detection devices, radar devices, communication devices, brake systems, and/or any other electronic system or avionics system used to operate the aircraft 104. Data obtained from the one or more avionics systems 106 may include, without limitation: flight data, aircraft heading, aircraft speed, aircraft position, altitude, descent rate, position of air spaces surrounding a current flight plan, activity of air spaces surrounding a current flight plan, or the like.

The server system 108 may include any number of application servers, and each server may be implemented using any suitable computer. In some embodiments, the server system 108 includes one or more dedicated computers. In some embodiments, the server system 108 includes one or more computers carrying out other functionality in addition to server operations. The server system 108 may store and provide any type of data. Such data may include, without limitation: flight plan data, aircraft parameters, avionics data and associated user actions, and other data compatible with the computing device 200.

The computing device 102 is usually located onboard the aircraft 104, and the computing device 102 communicates with the one or more avionics systems 106 via wired and/or wireless communication connection. The computing device 102 and the server system 108 may both be located onboard the aircraft 104. In other embodiments, the computing device 102 and the server system 108 may be disparately located, and the computing device 102 communicates with the server system 108 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

Figure 2:
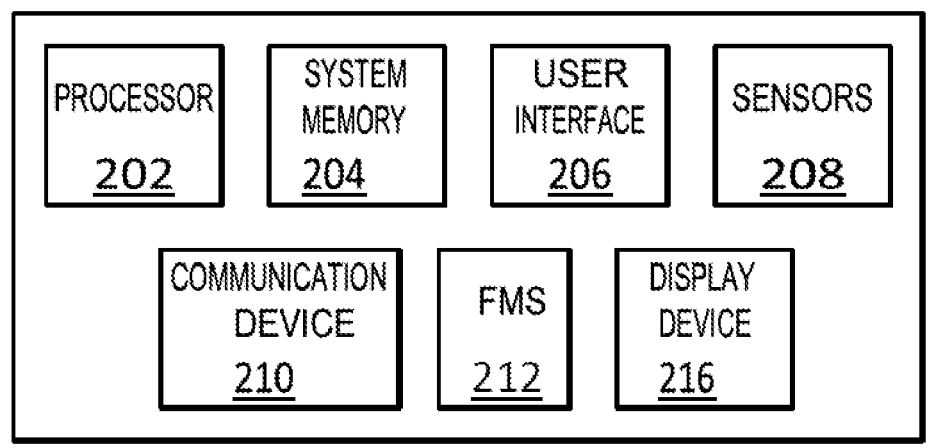
FIG. 2 shows a functional block diagram of a computing device in accordance in accordance with the disclosed embodiments.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: a processor 202; system memory 204; a user interface 206; a plurality of sensors 208; a communication device 210; a flight management system (FMS) 212; and a display device 216. These elements and features of the computing device 200 may be operatively associated with one another, coupled to one another, or otherwise configured to cooperate with one another as needed to support the desired functionality. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that are described in more detail below.

The processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 202 may be realized as one or more microprocessors, controllers, microcontrollers, or state machines. Moreover, the processor 202 may be implemented as a combination of computing devices, e.g., a combination of digital signal processors and microprocessors, a plurality of microprocessors, one or more microprocessors in conjunction with a digital signal processor core, or any other such configuration.

The processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the processor 202 such that the processor 202 can read information from, and write information to, the system memory 204. In the alternative, the system memory 204 may be integral to the processor 202. As an example, the processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 200. Data provided by the communication device 210 may include, without limitation, requests for avionics systems data, alerts and associated detail for display via an aircraft onboard display, and the like.

The FMS 212, as is generally known, is a specialized computer that automates a variety of in-flight tasks such as in-flight management of the flight plan. Using various sensors such as global positioning system (GPS), the FMS 212 determines the aircraft's position and guides the aircraft along its flight plan using its navigation database. From the cockpit, the FMS 212 is normally controlled through a visual display device such as a control display unit (CDU) which incorporates a small screen, a keyboard or a touchscreen. The FMS 212 displays the flight plan and other critical flight data to the aircrew during operation.

The FMS 212 may have a built-in electronic memory system that contains a navigation database. The navigation database contains elements used for constructing a flight plan. In some embodiments, the navigation database may be separate from the FMS 212 and located onboard the aircraft while in other embodiments the navigation database may be located on the ground and relevant data provided to the FMS 212 via a communications link with a ground station. The navigation database used by the FMS 212 may typically include: waypoints/intersections; airways; radio navigation aids/navigation beacons; airports; runway; standard instrument departure (SID) information; standard terminal arrival (STAR) information; holding patterns; and instrument approach procedures. Additionally, other waypoints may also be manually defined by pilots along the route.

The flight plan is generally determined on the ground before departure by either the pilot or a dispatcher for the owner of the aircraft. It may be manually entered into the FMS 212 or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. The aircrew may use the FMS 212 to modify the plight flight plan before takeoff or even while in flight for variety of reasons. Such changes may be entered via the CDU. Once in flight, the principal task of the FMS 212 is to accurately monitor the aircraft's position. This may use a GPS, a VHF omnidirectional range (VOR) system, or other similar sensor in order to determine and validate the aircraft's exact position. The FMS 212 constantly cross checks among various sensors to determine the aircraft's position with accuracy.

Additionally, the FMS 212 may be used to perform advanced vertical navigation (VNAV) functions. The purpose of VNAV is to predict and optimize the vertical path of the aircraft. The FMS 212 provides guidance that includes control of the pitch axis and of the throttle of the aircraft. In order to accomplish these tasks, the FMS 212 has detailed flight and engine model data of the aircraft. Using this information, the FMS 212 may build a predicted vertical descent path for the aircraft. A correct and accurate implementation of VNAV has significant advantages in fuel savings and on-time efficiency.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the processor 202. The processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Uncertified data applications for aviation operations make use of real time data (e.g., both in-air and on ground) available from industry certified vehicle electronics applications which are widely used and commercially available. Other uncertified applications provide real time information from the external sources to the crew to make important decisions or computations. The number of uncertified applications is rapidly growing and both certified and uncertified applications need to work seamlessly together. The uncertified applications offer several advantages such as inexpensive cost, quick development and deployment, sophisticated features, processing speed, etc. Also, increasing robust connectivity between certified applications and uncertified applications allows many non-safety critical functionalities to be developed as uncertified applications (e.g., flight planning applications, weight balance calculations).

Embodiments of the present invention provide certified and uncertified applications data together on single combined display. The certified application data has higher accuracy while the uncertified application data has a lower or unknown degree of accuracy. The presentation of uncertified application layer data is displayed as being distinctly different from certified application layer data. Typically, the uncertified application data layer is only displayed during designated phases of the aircraft flight such as the air cruise phase and during the surface navigation phase of the aircraft.

In some embodiments, the uncertified data received is mapped to the certified application data with consideration to the aircraft parameters like position, location, orientation, etc. For example, position of the aircraft may be used to transform uncertified weather data when available uncertified weather data from surrounding regions which can be displayed along with the certified data of the aircraft's current position. In other embodiments, the uncertified data layer is uniquely represented as individual elements of the uncertified data based on the pilot's or crewmember's selection. For example, the individual elements of the uncertified data may be represented to convey the latency/freshness and confidence level of the data. The uncertified data may be filtered for accuracy.

Figure 3:
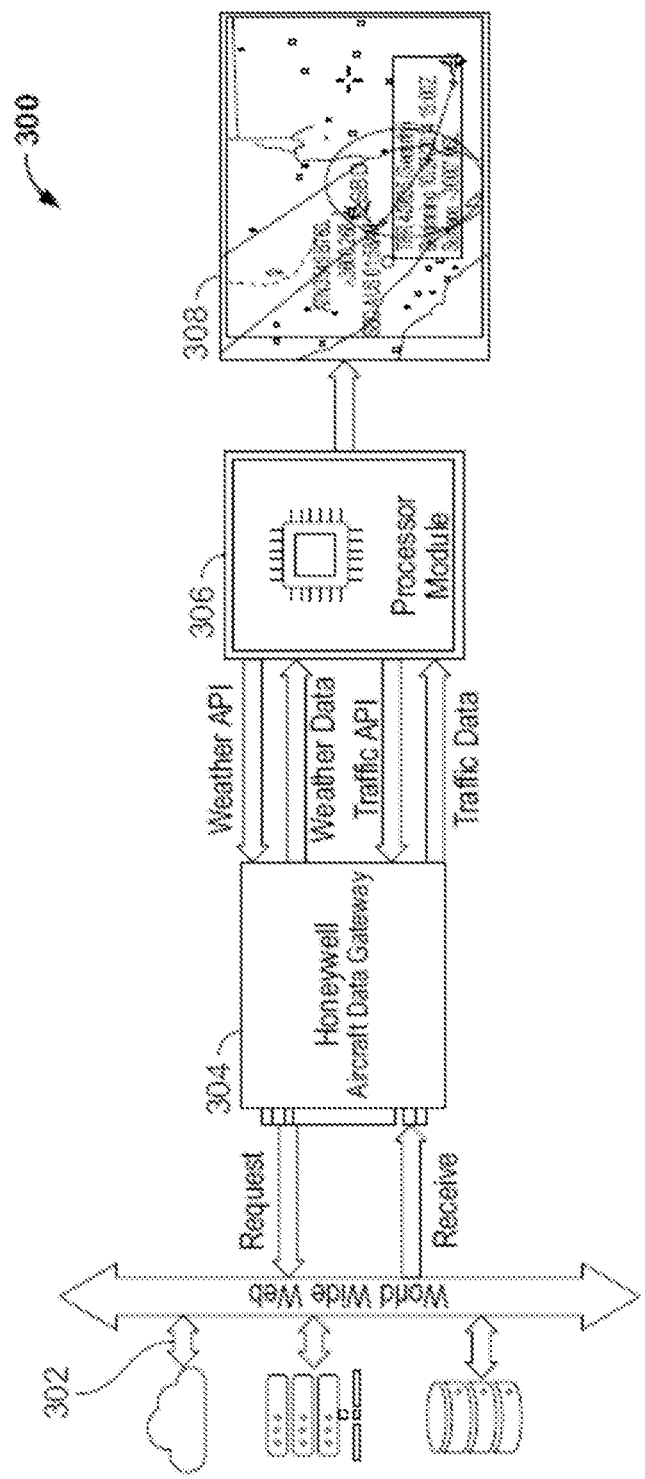
FIG. 3 shows a diagram representing a system for retrieving and displaying certified and uncertified data in accordance with the disclosed embodiments.

FIG. 3 shows a diagram 300 representing a system for retrieving and displaying certified and uncertified data in accordance with the disclosed embodiments. The uncertified data 302 is retrieved by a request through an aircraft data gateway 304. These embodiments can be considered for different types of vehicles including: aircraft, urban air mobility (UAM) vehicles, rotorcrafts, etc. The data may be received from a variety of databases, applications and cloud-based sources. Examples of sources of application data include: hazard advisor; enhanced and integrated weight/balance; aeronautical mapping; enhanced airways; climb/descent performance; hold advisor; dynamic winds and temperatures; taxi routing; etc. In this example, weather and air traffic data are requested by a processor module 306 receives weather and air traffic data through a specific application program interfaces (API). The processor module 306 then creates a certified data display and an overlayed uncertified data display which are used to create a combined data display 308.

Figure 4:
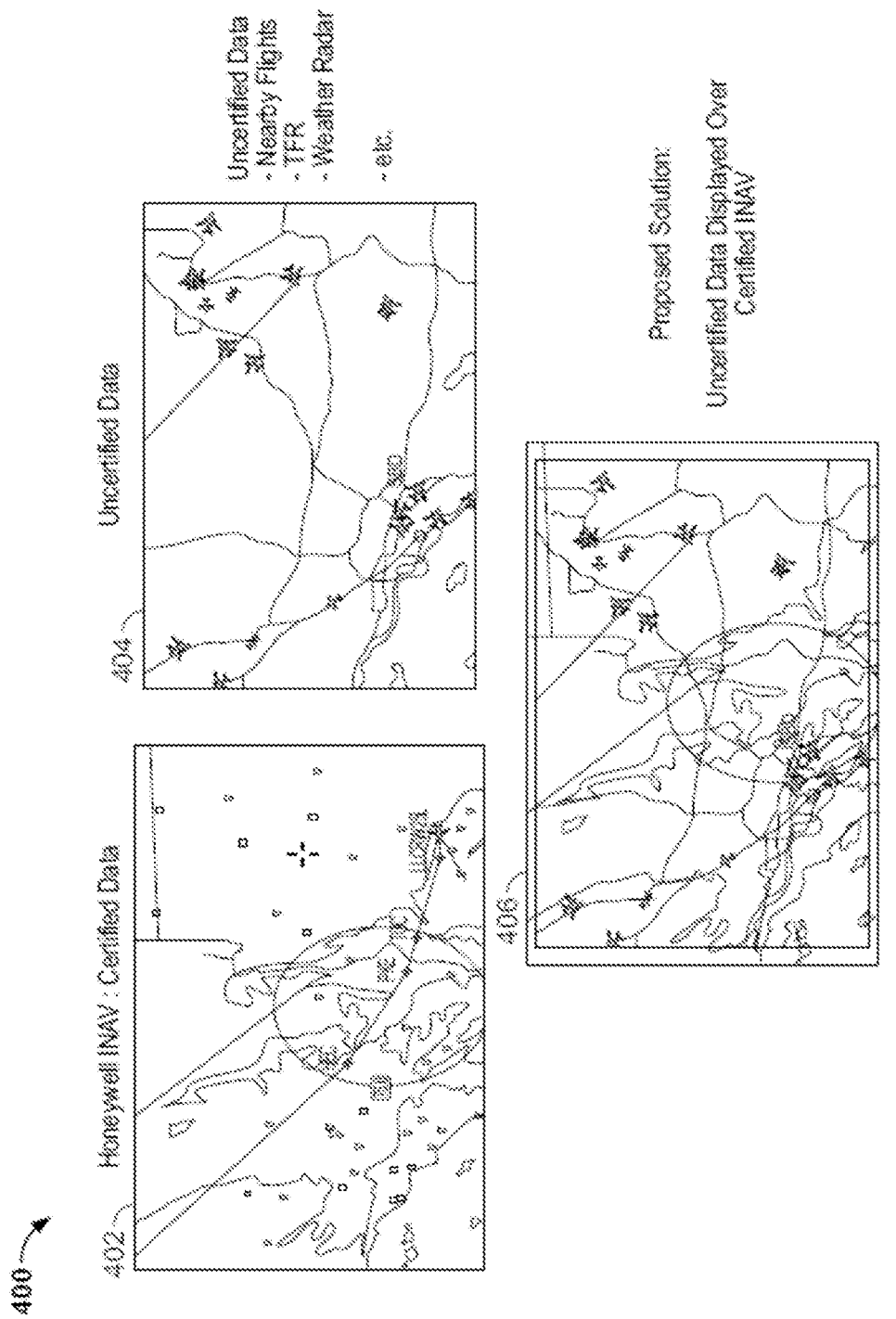
FIG. 4 shows examples of displays of certified, uncertified and combined data in accordance with the disclosed embodiments.
Figure 5:
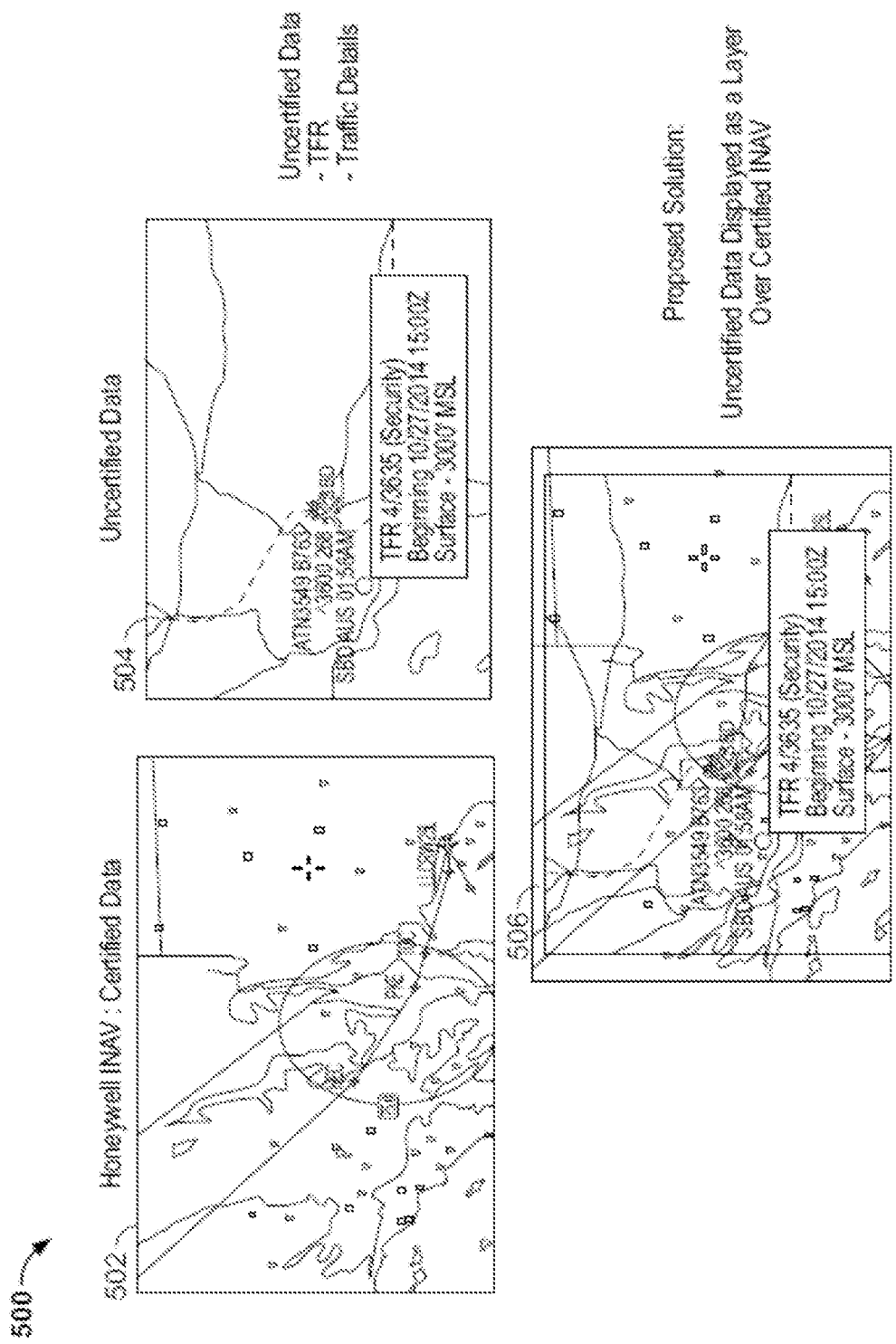
FIG. 5 shows alternative examples of displays of certified, uncertified and combined data in accordance with the disclosed embodiments.

FIG. 4 shows examples 400 of displays of certified, uncertified and combined data in accordance with the disclosed embodiments. These examples show a certified data display 402, an uncertified data display 404 and a combined data display 406 of nearby flights, weather radar and temporary flight restrictions (TFR). FIG. 5 shows alternative examples 500 of displays of certified, uncertified and combined data in accordance with the disclosed embodiments. These examples show a certified data display 502, an uncertified data display 504 and a combined data display 506 of air traffic details and temporary flight restrictions (TFR).

Figure 6A:
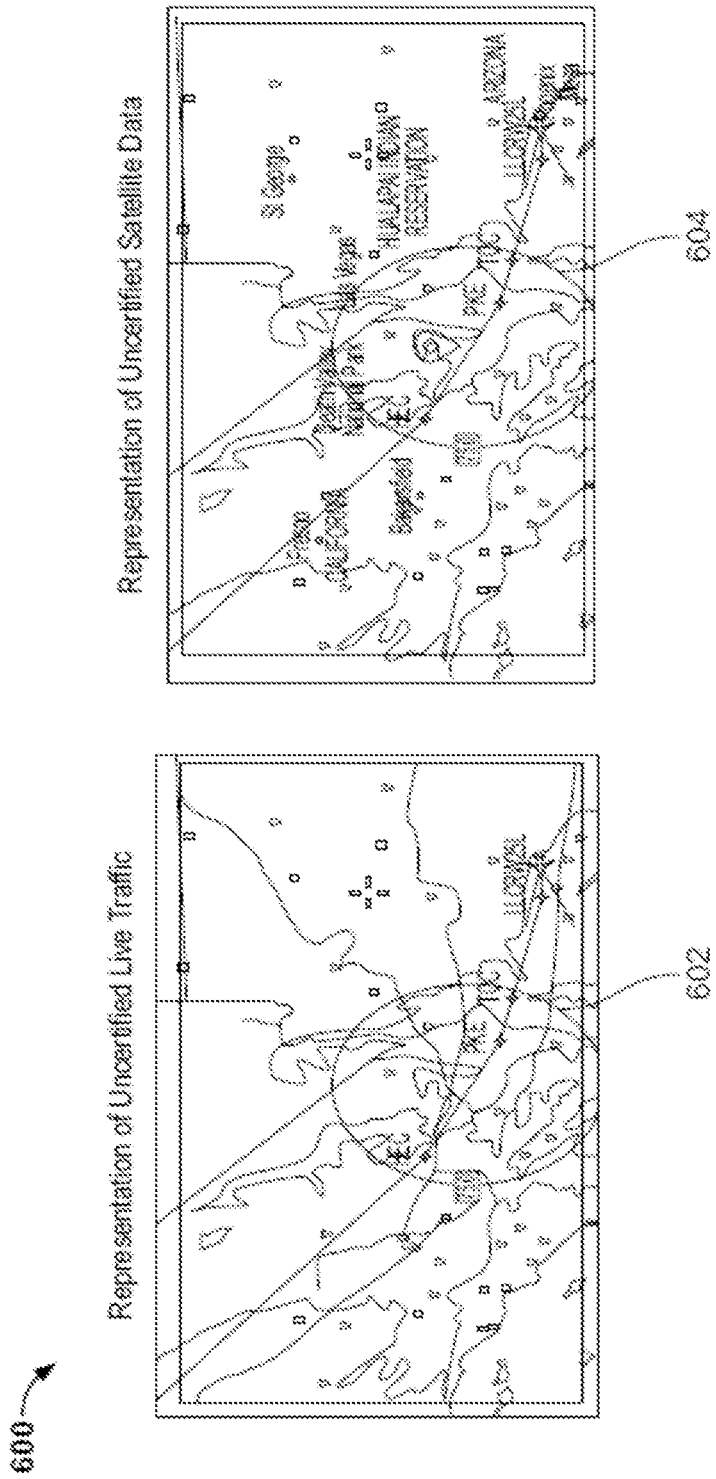
FIG. 6A shows examples of displays of certified and uncertified data in accordance with the disclosed embodiments.
Figure 6B:
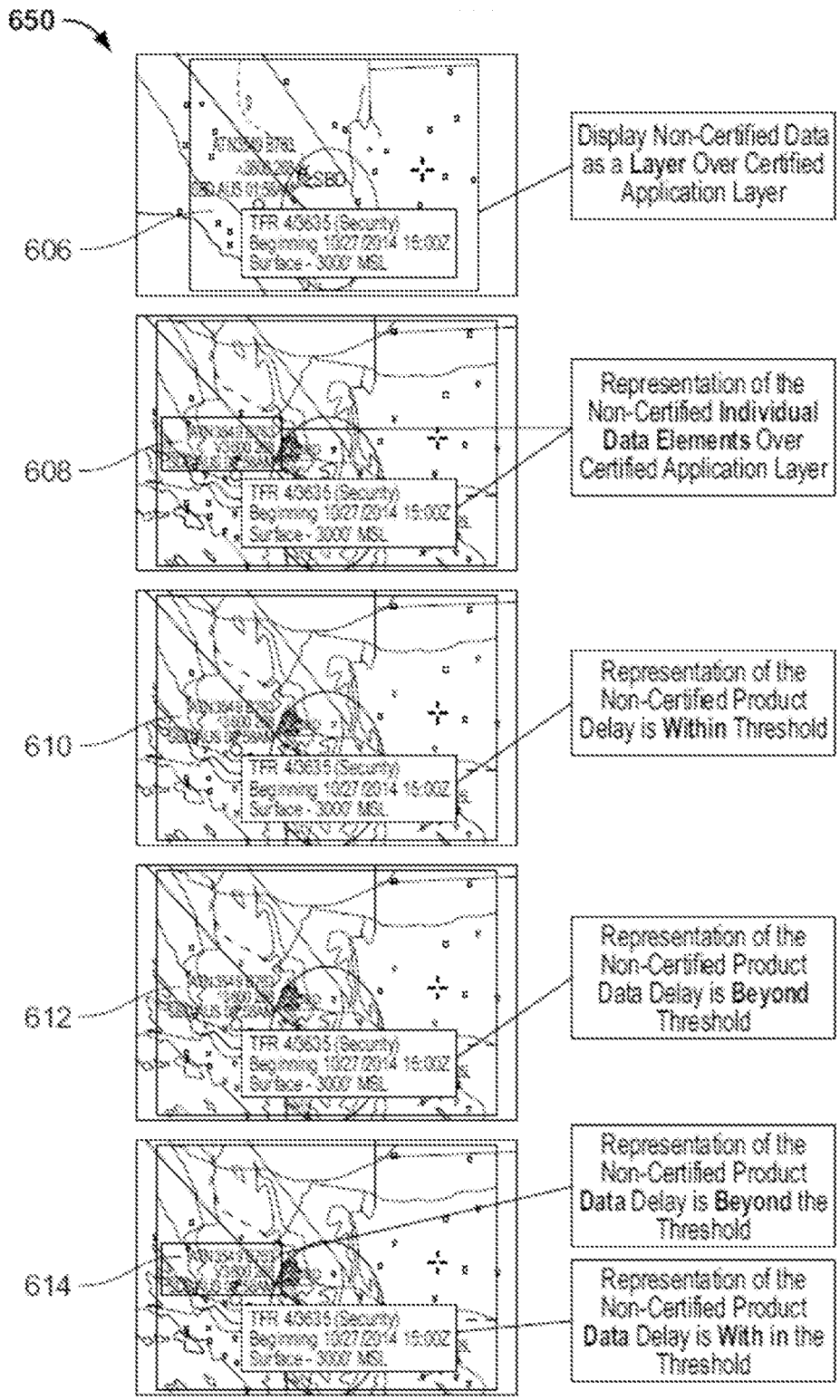
FIG. 6B shows examples of displays of combined data with representations of distinct elements of the uncertified data in accordance with the disclosed embodiments.

FIG. 6A shows examples 600 of displays of certified and uncertified data in accordance with the disclosed embodiments. These examples show a certified data display 602 of live air traffic and an uncertified data display 604 of satellite data. FIG. 6B shows examples 650 of displays of combined data from the displays shown in FIG. 6A with representations of distinct elements of the uncertified data in accordance with the disclosed embodiments. These examples show an uncertified data display 606 that is layered over a certified data layer, an uncertified data display 608 with a representation of uncertified data elements, an uncertified data display 610 with a representation of uncertified data elements within a latency/freshness threshold, an uncertified data display 612 with a representation of uncertified data elements beyond a latency/freshness threshold and an uncertified data display 614 with a representation of multiple uncertified data elements both within and beyond a latency/freshness threshold.

Figure 7:
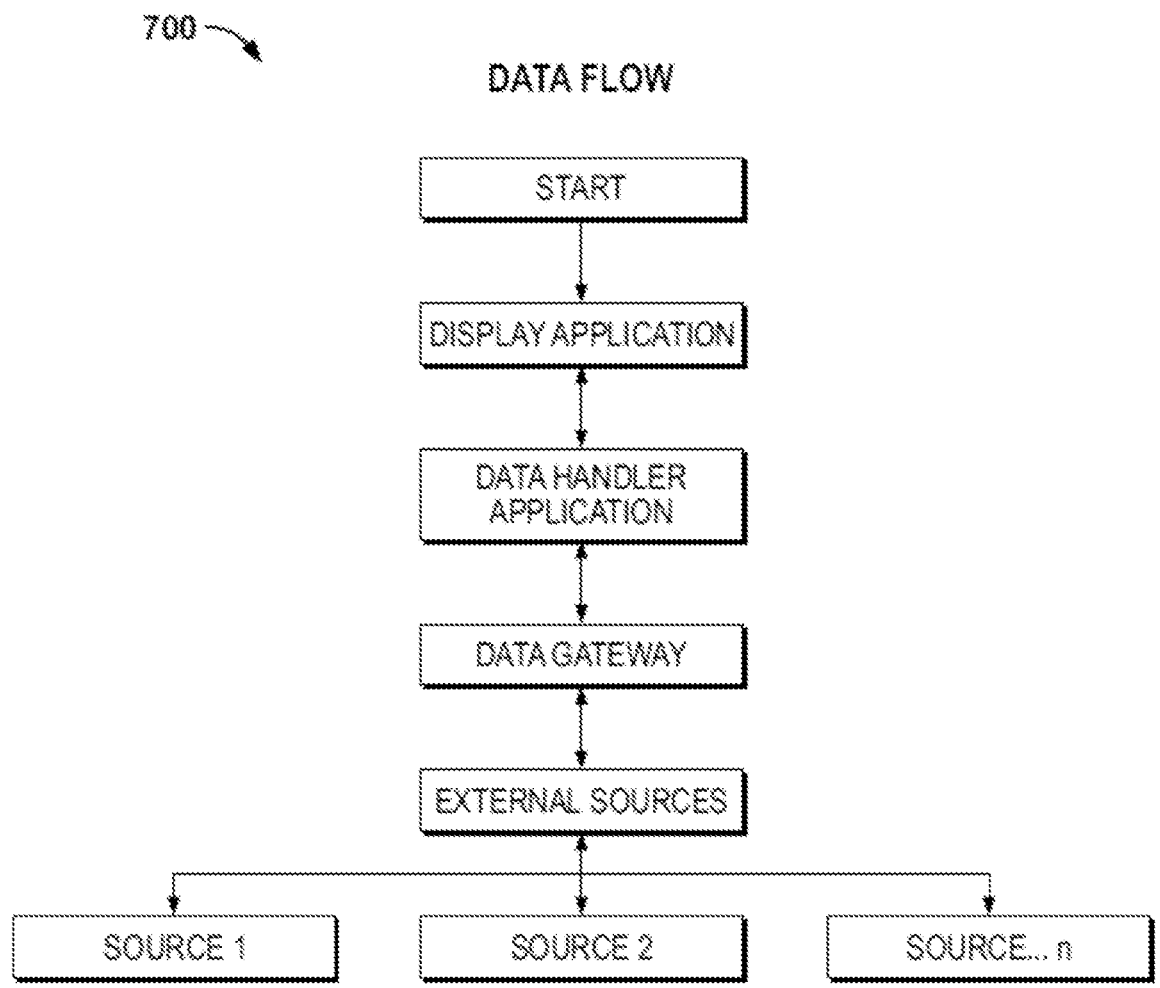
FIG. 7 shows a flowchart of the data flow in accordance with the disclosed embodiments.

FIG. 7 shows a flowchart 700 of the data flow in accordance with the disclosed embodiments. With reference to FIG. 3 as previously discussed, the data flow begins with a request generated through the processor module 306 using the display application to a data handler application using an API. The aircraft data gateway 304 passes the request on to the appropriate external sources of uncertified data 302.

Figure 8:
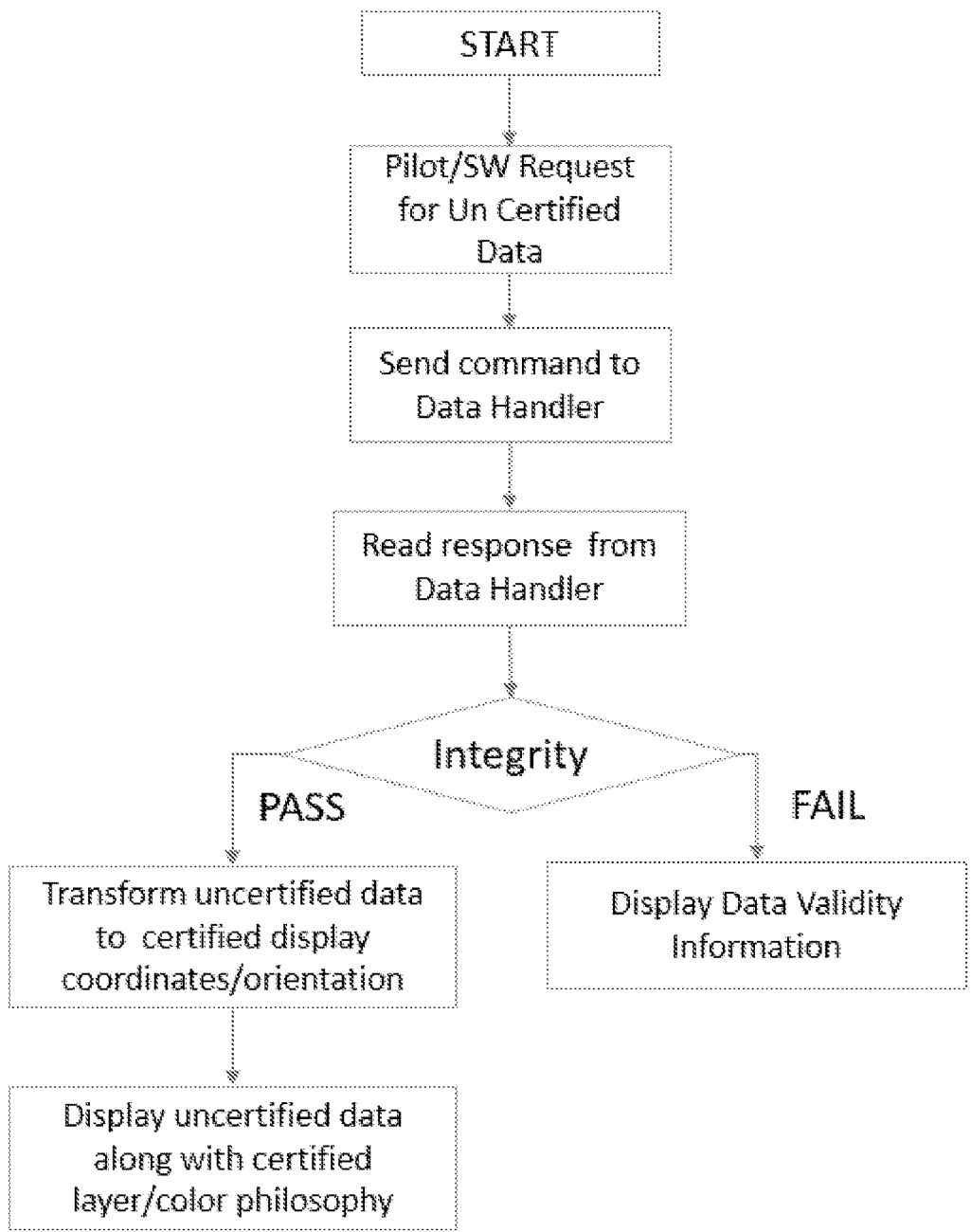
FIG. 8 shows a flowchart of the display application flow in accordance with the disclosed embodiments.

FIG. 8 shows a flowchart of the display application flow in accordance with the disclosed embodiments. With reference to FIGS. 3 and 7 as previously discussed, the display application flow begins with the pilot or other crewmember requesting uncertified data. The request is sent to the processor module 306 using the display application to a data handler application using an API. The data handler, upon receiving the uncertified data from external sources, performs and integrity check on the uncertified data. If the uncertified data passes the integrity check, it is layered onto the display of certified data in accordance with the aircraft's location/orientation along with any other combined display characteristics. If the uncertified data fails the integrity check, the validity information is displayed along with the uncertified data.

Figure 9:
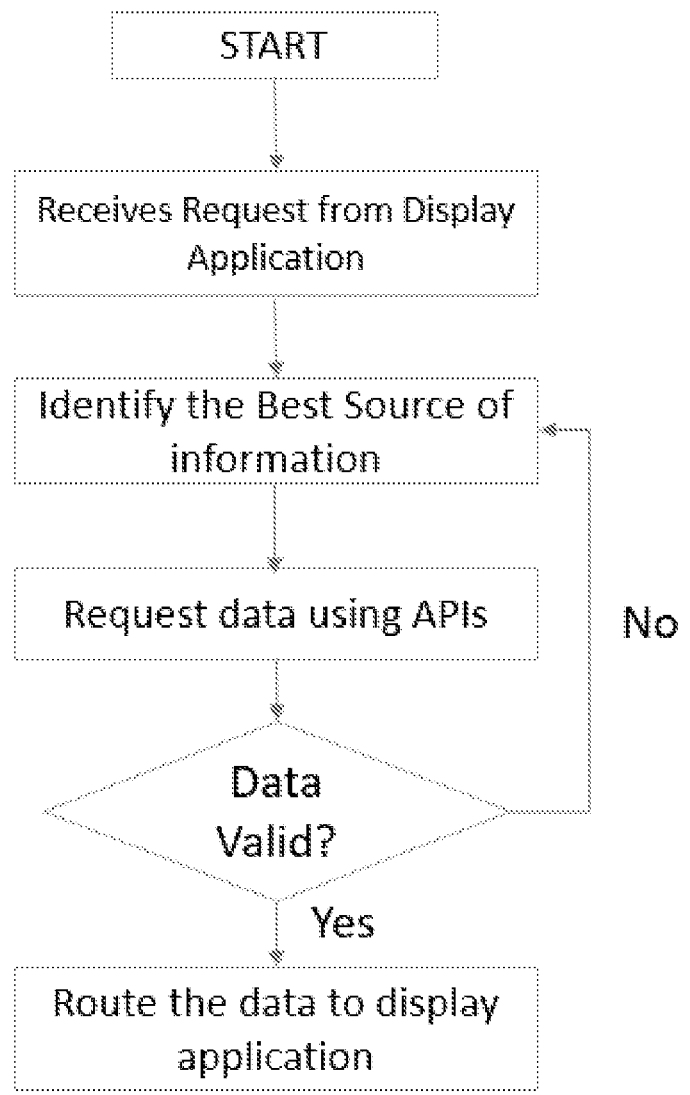
FIG. 9 shows a flowchart of the data handler flow in accordance with the disclosed embodiments.

FIG. 9 shows a flowchart of the data handler flow in accordance with the disclosed embodiments. With reference to FIGS. 3, 7 and 8 as previously discussed, the data handler application flow begins with the receipt of the request for uncertified data from the display application. The data handler identifies the best source of information for the uncertified data and requests the data through the appropriate API. If the data from the identified source is valid, it is routed to the display application. However, if the data from the identified source is not valid, the data handler requests uncertified data from another source that was identified by the data handler application.

Figure 10:
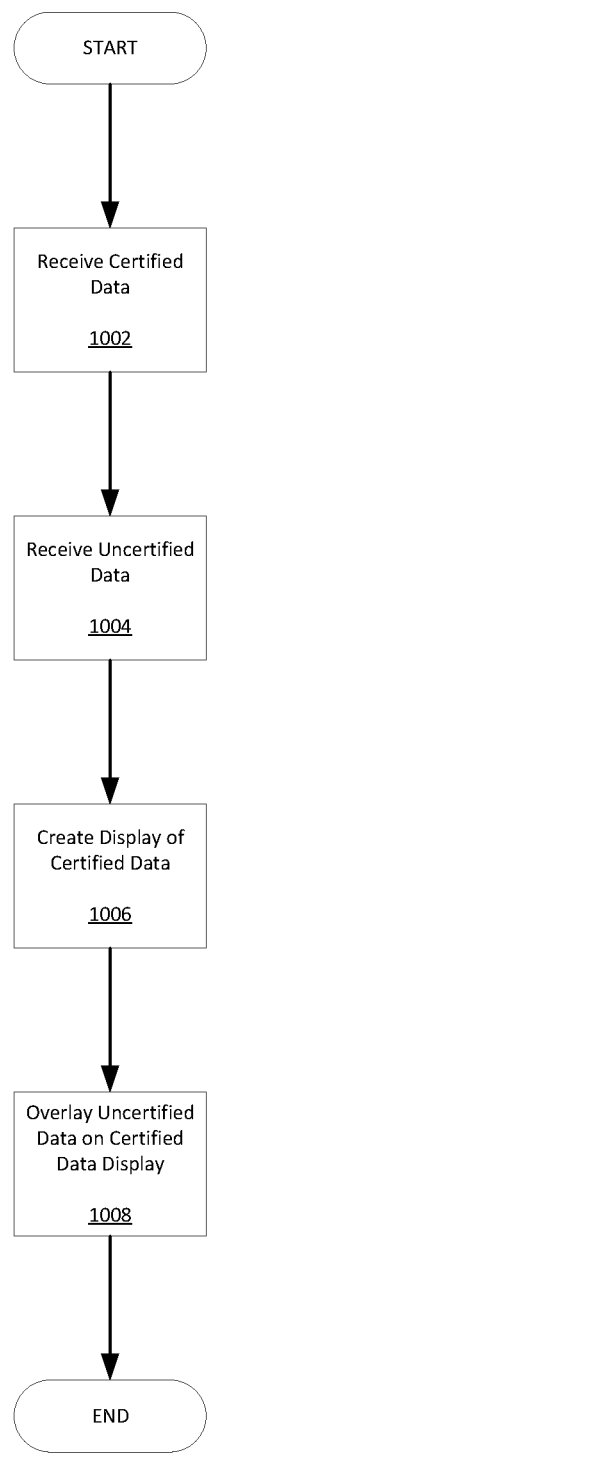
FIG. 10 shows a flowchart of a method for displaying uncertified data for aircraft operations in accordance with the disclosed embodiments.

FIG. 10 shows a flowchart 1000 of a method for displaying uncertified data for aircraft operations in accordance with the disclosed embodiments. The method comprises receiving certified data for aircraft operations 1002. The certified data is provided by devices and software applications that have a predetermined acceptable degree of accuracy. Additionally, uncertified data is received 1004 for aircraft operations and the uncertified data is provided by devices and software applications that have an undetermined degree of accuracy. A display is created 1006 of the certified data for a display device that is used by an aircraft crewmember of an aircraft. Additionally, a display is created of the uncertified data for the display device. The certified data display is overlayed 1008 with the uncertified data display on the display device to create a combined data display. The uncertified data is clearly indicated on the combined data display.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for displaying uncertified data for aircraft operations, comprising:
    receiving certified data for aircraft operations, where the certified data is provided by devices and software applications that have a predetermined acceptable degree of accuracy;
    receiving uncertified data for aircraft operations, where the uncertified data is provided by devices and software applications that have an undetermined degree of accuracy;
    creating a display with a processor module of the certified data for a display device used by a crewmember of an aircraft;
    creating a display with the processor module of the uncertified data for the display device; and
    overlaying the certified data display with the uncertified data display on the display device to create a combined data display, where the uncertified data is clearly indicated on the combined data display and where the uncertified data is shown as distinct elements of data that are indicated by level of certainty.

2. The method of claim 1, where the uncertified data is mapped based on the aircraft's position and orientation.

3. The method of claim 1, where the combined data display is only shown during a designated phase of the flight of the aircraft.

4. The method of claim 3, where the designated phase of the flight of the aircraft is an air cruising phase.

5. The method of claim 3, where the designated phase of the flight of the aircraft is an surface navigation phase.

6. The method of claim 1, where the designated phase of the flight of the aircraft is an air cruising phase.

7. The method of claim 1, where the distinct elements of data which a shown are selected by the crewmember.

8. The method of claim 1, where the distinct elements of data are indicated by latency.

9. The method of claim 1, where the uncertified data comprises weather data.

10. The method of claim 1, where the uncertified data comprises air traffic data.

11. The method of claim 1, where the uncertified data comprises temporary flight restrictions (TFR).

12. The method of claim 1, where the aircraft comprises an urban air mobility (UAM) vehicle.

13. The method of claim 1, where the aircraft comprises a rotor aircraft.

14. A system for displaying uncertified data for aircraft operations, comprising:
    a flight management system (FMS) located on board an aircraft, where the FMS,
        receives certified data for aircraft operations, where the certified data is provided by devices and software applications that have a predetermined acceptable degree of accuracy, and
        receives uncertified data for aircraft operations, where the certified data is provided by devices and software applications that have an undetermined degree of accuracy; and
    a display device used by a crewmember of the aircraft, where the display device,
        creates a display of the certified data with a processor module,
        creates a display of the uncertified data with the processor module, and
        overlays the certified data display with the uncertified data display to create a combined data display, where the uncertified data is clearly indicated on the combined data display and where the uncertified data is shown as distinct elements of data that are indicated by level of certainty.

* * * * *